United States Patent [19]

Cuniberti

[11] 3,957,478

[45] May 18, 1976

[54] COOLING PRESSED GLASS ARTICLES

[75] Inventor: Mario Cuniberti, Columbus, Ohio

[73] Assignee: Owens-Illinois, Inc., Toledo, Ohio

[22] Filed: Jan. 27, 1975

[21] Appl. No.: 544,035

[52] U.S. Cl.................................. 65/181; 65/262;
65/306; 65/348; 181/36 D
[51] Int. Cl.²........................................ C03B 11/00
[58] Field of Search............. 65/261, 262, 181, 348,
65/349, 111, 117, 306, 305, 356; 181/36 C,
36 D, 36 E, 36 R

[56] References Cited
UNITED STATES PATENTS

| | | | |
|---|---|---|---|
| 1,209,472 | 12/1916 | Meyers, Jr. | 65/261 |
| 2,066,283 | 12/1936 | Wadman | 65/348 X |
| 2,123,145 | 7/1938 | Peiler | 65/262 |
| 2,180,737 | 11/1939 | Hess | 65/117 X |
| 2,442,315 | 5/1948 | Samuelson et al. | 65/262 |
| 3,353,943 | 11/1967 | Loutte | 65/356 X |

*Primary Examiner*—S. Leon Bashore
*Assistant Examiner*—Frank W. Miga
*Attorney, Agent, or Firm*—Steve M. McLary; Edward J. Holler

[57] ABSTRACT

An improved glass pressing machine which captures exhausting cooling gas to reduce noise in the vicinity of the machine. A glass press for making television face plates includes a cooling station where large quantities of a gas, such as air, are blown on a newly formed article to remove residual heat. Escape of this air creates a noise problem in the area of the machine. The tube which introduces the gas is substantially enclosed by a shroud. The gas, as it completes its cooling function, is conducted from an exhaust pipe in the shroud to a vent stack which delivers the gas to a location remote from the machine. The spent cooling gas is therefore not exhausted at the machine location to create a noise problem.

6 Claims, 2 Drawing Figures

COOLING PRESSED GLASS ARTICLES

BACKGROUND OF THE INVENTION

This invention generally relates to the pressing of glass articles. More specifically, this invention relates to the cooling of pressed glass articles. Most particularly, this invention relates to the capture of spent cooling gas to prevent noise generation at the cooling location resulting from free exhaust of the cooling gas to the atmosphere.

The influence of noise on an industrial environment has become of increasing importance. One source of noise can be the exhaust of high velocity or high pressure air into the atmosphere. U.S. Pat. Nos. 2,122,517; 3,667,571; and 3,757,875 all show examples of prior art devices to control such air. One source of exhaust air generated noise is in the cooling of television face plates in the pressing operation which forms them from molten glass. In the past, high volumes of air were directed at the newly formed face plates to cool them, and the air so used was directly discharged in the surrounding atmosphere. This resulted in the generation of substantial noise by the exhausted air. I have provided a cooling station of the glass pressing machine with an enveloping shroud which captures all of the cooling air that is used and conducts it to a remote location for discharge to the atmosphere. This technique significantly reduces the noise level of the environment of the glass pressing machinery.

SUMMARY OF THE INVENTION

My invention is an improvement in an apparatus for pressing glass parts. In this apparatus, an open-topped shape-defining mold, including a lower shell mold and an upper, removable ring mold, carrying a pressed glass part is indexed from a pressing station to a cooling station. At the cooling station, a cooling tube is moved into proximity to the pressed glass part by a reciprocating drive mechanism. A high volume flow of gas is directed from the cooling tube onto the pressed glass part. My improvement includes the following elements: A shroud that has a closed end remote from the mold and an open end adjacent to but spaced from the upper surface of the ring mold, the open end having an opening that is complemental in shape to the shape of the upper surface of the ring mold, the cooling tube being secured in an opening formed in the closed end of the shroud in substantially gas-tight engagement to thereby retain the closed end as a barrier to gas flow, the cooling tube extending through the shroud and terminating adjacent the pressed glass part; a baffle, attached to the lower end of the cooling tube, the baffle having a shape complemental to but slightly smaller than the opening in the ring mold; a means for attaching the shroud to the reciprocating drive mechanism so that the shroud and cooling tube will be raised and lowered as a unit; and, a means for removing substantially all cooling gas introduced through the cooling tube into the shroud to a location remote from the mold.

DETAILED DESCRIPTION OF THE DRAWINGS

Figure 1:
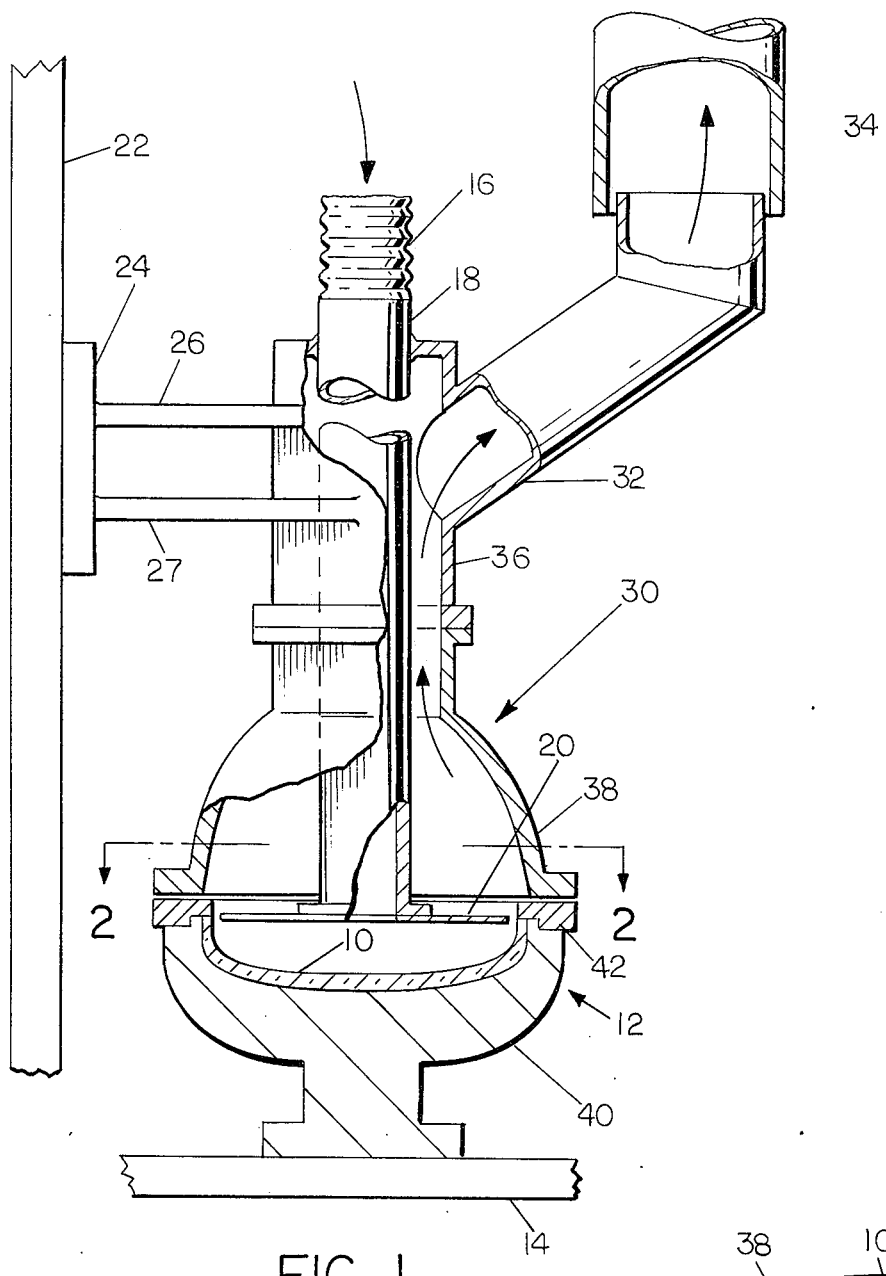
FIG. 1 is a side elevational view, partially in cross section, of the apparatus of the present invention partially removed from its operational environment.

The apparatus of the present invention is shown in FIG. 1 partially removed from its operational environment. The apparatus of the present invention is designed to operate with a glass forming machine such as that shown in U.S. Pat. No. 3,119,681, the teachings of which are hereby incorporated by reference. This type of machine is used to form the face plates for televison picture tubes by a glass pressing process. The pressed glass part or face plate, as it is in this case, 10 is contained within an open-topped shape-defining glass mold 12. The mold 12 is carried by and moves with a rotatable drive table 14. The drive table 14 moves the mold 12 to a plurality of positions around a circular path of travel. The mold 12 is furnished with a molten glass charge at one location, rotated to a pressing location where the face plate 10 is pressed into conformity with the interior contours of the mold 12, and then rotated to a cooling station which is illustrated in FIG. 1. The face plate 10 is a relatively thick section of glass and after pressing retains an appreciable amount of residual heat which must be removed in a carefully controlled manner to maintain accuracy of the final product. To this end, the machine illustrated in the cited patent has a plurality of cooling stations which direct relatively large volumes of a gaseous cooling medium such as air onto the formed face plate 10. This allows removal of the residual heat and complete solidification of the face plate 10 to allow its removal from the mold 12 for further processing. As was noted, air is commonly used as the gaseous cooling medium, and this air is furnished at a pressure of approximately one pound per square inch above atmospheric pressure at a volume of several tens of thousands of cubic feet per minute from a conventional blower. It may be appreciated that air in this volume and at this pressure can make an appreciable noise when it impacts onto a surface and is allowed to expand freely. The present invention has been devised to prevent or more properly to contain the noise generated by this cooling air and to thereby lower the environmental noise level adjacent to these particular types of glass forming machines.

In this glass forming machine as known and used in the past, the cooling air is introduced from a blower, which is not shown, into a flexible conduit 16. The flexible conduit 16 is attached to a relatively rigid cooling tube 18. In its normal operational position, the cooling tube 18 terminates at a location near the top of the mold 12 and generally positioned centrally of the mold 12. Attached to the lower end of the cooling tube 18 is a baffle plate 20. The baffle plate 20 extends below the top of the mold 12 to bring the cooling air closer to the face plate 10. The baffle plate 20 extends outwardly from the end of the cooling tube 18 and is shaped to generally conform to the peripheral dimensions of the face plate 10. Note that the baffle plate 20 does not extend completely over the face plate 10 but is slightly smaller and thus allows a path for exhaust of cooling air which is introduced down the cooling tube 18. There is usually a gap of only one quarter inch between the mold 12 and the edge of the baffle plate 20. The path of air from the cooling tube 18 is one of impact onto the face plate 10 and then exhaust around the gap which exists between the mold 12 and the periphery of the baffle plate 20. Also as a part of the known and prior operation of this type of glass pressing machine, one of the support columns 22 of the machine serves as a guide rail for a slide plate 24 which can be moved up and down relative to the support column 22 by means of a conventional reciprocating drive mechanism, such as an air cylinder or a hydraulic cylinder, which is not shown. Extending outwardly from the slide plate 24 are two cantilevered support beams 26 and 27 which under the operational conditions of the prior art would have been attached to the cooling tube 18. The machine is so programmed that when a mold 12 is about to be indexed from the cooling station by the drive table 14, the slide plate 24 is raised upwardly by the reciprocating drive mechanism thus carrying the cooling tube 18 and baffle plate 20 away from the mold 12. The position which the cooling tube 18 and baffle plate 20 assume in their extreme down location can be adjusted by means of variable stops. This allows the use of molds 12 of varying heights on the drive table 14 while not requiring extensive adjustment or realignment of the basic cooling system for the face plates 10. This flexibility is necessary to allow making face plates 10 of a variety of sizes on the same machine. While not discussed in detail, it would be possible to move the mold 12 up and down and leave the cooling system fixed in place.

The modification of the prior art system described to effect the purposes of the present invention is shown in FIG. 1. The cantileverd support beams 26 and 27 are now shown as attached to the outer surface of a shroud member 30. The cooling tube 18 passes through the top of the shroud 30, with the remainder of the top of the shroud 30 being closed to prevent escape of any of the cooling fluid from this part of the shroud 30. The lower portion of the shroud 30 is open and generally conforms to the exterior contours of the mold 12. Another way to state this relationship is to say that the open end of the shroud 30 has a shape that is complemental to the shape of the upper surface of the mold 12. It can therefore be seen that the entire cooling tube 18 and baffle plate 20 are surrounded by the shroud 30. Now, cooling fluid which exits from the cooling tube 18 and is directed by the baffle plate 20 around and out between the baffle plate 20 and the mold 12 is contained or trapped by the shroud 30. As the air exits from around the baffle plate 20, it will tend to flow upwardly as a result of the pressure differential behind the exiting air forcing it away from the outlet of the cooling tube 18. The upper portion of the shroud 30 has a large opening formed in the side thereof with an exhaust pipe 32 secured in the opening in the shroud 30. The air moving through the shroud 30 then leaves through the exhaust pipe 32 since this is the only possible exit for the air from the shroud 30. The exhaust pipe 32 is telescopically engaged with a vent stack 34. The vent stack 34 carries the exhaust air out of the working area and thus allows its noise and pressure to be dissipated at a point remote from that at which the noise of such pressure reduction would cause operator discomfort. Furthermore, the length of the vent stack 34 allows additional noise reduction before the exhaust air is ultimately released to the atmosphere. Note that in the extreme down position of the slide plate 24, as shown in FIG. 1, the exhaust pipe 32 and the vent stack 34 are barely in communication. However, as the slide plate 24 moves upward to allow the mold 12 to be indexed to the next position, the exhaust pipe 32 smoothly telescopes into the vent stack 34 to compensate for this vertical motion. As may be seen in FIG. 1, the shroud 30 may be made in two separate pieces if so desired. An upper segment 36 is of a generally cylindrical configuration and is permanently attached to the two support beams 26 and 27. A lower segment 38 is cylindrical in shape in its upper portion to match with the upper segment 36 but flares outwardly at its lower portion to enable this segment 38 to completely cover the entire mold 12. The upper segment 36 and the lower segment 38 may be bolted together to form a unitary assembly while in use. The advantage of making the lower segment 38 separable from the upper segment 36 is that when different molds are placed on the drive table 14 in order to produce different sizes of face plates 10, a new lower segment 38 may be placed in position on the upper segment 36 to allow proper mating of the lower segment 38 with the mold 12. This then assures that all of the cooling air which comes down the cooling tube 18 may be successfully captured by the shroud 30 no matter how large or small the mold 12 may be. In actual test measurements in a television face plate making operation, it has been found that the use of the shroud 30 of the present invention as shown in FIG. 1 will allow a reduction in the sound pressure level in the area immediately surrounding the glass forming machine of approximately five times or an actual measured value of about 15 decibels.

Figure 2:
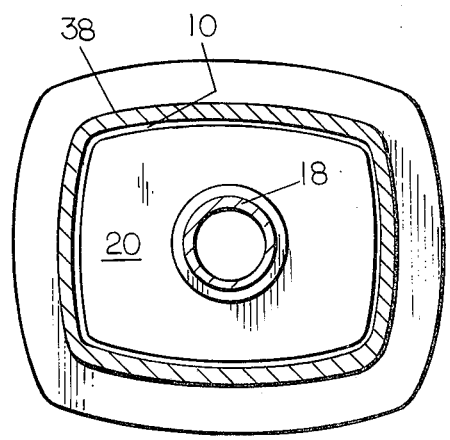
FIG. 2 is a cross sectional view taken along line 2—2 of FIG. 1.

FIG. 2 is included simply to further emphasize the point that the face plate 10 is of a generally rectangular configuration and that, therefore, the mold 12 itself is similarly rectangularly shaped to define the configuration of the face plate 10. Likewise, the lower segment 38 of the shroud 30 must also be rectangular at its lowermost portion to allow complete containment of the cooling air which passes over the face plate 10.

It should be noted in FIG. 1 that the lower segment 38 of the shroud 30 does not touch the top of the mold 12. At this stage in the forming process, the face plate 10 is quite sensitive and susceptible to checking or cracking. If the shroud 30 were in contact with the mold 12, it is quite likely that appreciable vibration would be transmitted to the mold 12. Such vibration would have a tendency to check or crack the newly formed face plate 10. By maintaining this gap at a rather small value, on the order of one-thirty second to one-eighth inch, there is no tendency for the cooling air to escape through this gap and thus defeat the purpose of this invention. Rather, the volume and velocity of the cooling air is such that it rushes past the gap between the shroud 30 and the mold 12 and creates a Venturi effect. This actually causes some inspiration of outside air through the gap, thereby containing all of the cooling air and noise for disposal elsewhere.

While the mold 12 has been referred to as a unitary structure for simplicity, those skilled in the art will recognize that the mold 12 is commonly made up of two separate sections; a lower shell mold 40 and an upper, removable ring mold 42. The inner edge of the lower shroud segment 38 is not in alignment with the inner edge of the ring mold 42. This offset is clearly visible in FIG. 1. The offset between these two elements acts in conjunction with the gap between the top of the ring mold 42 and the bottom of the lower shroud segment 38 to further increase inspiration of outside air into the shroud 30 as previously explained by creating a zone of subatmospheric pressure when the exhausting cooling air flows by that area. Also note that the baffle 20 is slightly smaller than the opening of the ring mold 42.

What I claim is:

1. In an apparatus for pressing glass parts wherein an open-topped shape-defining mold, including a lower shell mold and an upper, removable ring mold, carrying a pressed glass part is indexed from a pressing station to a cooling station, wherein a cooling tube is moved into proximity to said pressed glass part at said cooling station by a reciprocating drive mechanism, and wherein a high volume flow of gas is directed from said cooling tube onto said pressed glass part to cool said pressed glass part, the improvement in said apparatus which comprises, in combination:

- a shroud having a closed end remote from said mold and an open end adjacent to but spaced from the upper surface of said ring mold, said open end having an opening that is complemental in shape to the shape of the upper surface of said ring mold, said cooling tube being secured in an opening formed in the closed end of said shroud in substantially gas-tight relationship to thereby retain said closed end as a barrier to gas flow, said cooling tube extending through said shroud and terminating adjacent to said pressed glass part;
- a baffle, attached to the lower end of said cooling tube, said baffle having a shape complemental to but slightly smaller than the opening in said ring mold;
- means for attaching said shroud to said reciprocating drive mechanism whereby said shroud and said cooling tube may be moved as a unit by said drive mechanism; and
- means for removing substantially all cooling gas introduced through said cooling tube into said shroud to a location remote from said mold.

2. The improvement of claim 1 wherein said shroud comprises:
- an upper segment, attached to said reciprocating drive mechanism, having a closed end through which said cooling tube passes and to which said cooling tube is secured; and
- a lower segment, removably secured to said upper segment, the lower portion of said lower segment having an opening that is complemental in shape to the shape of the upper surface of said ring mold.

3. The improvement of claim 1 wherein said means for removing cooling gas includes:
- an exhaust pipe secured in an opening near the top of said shroud and in communication with the interior of said shroud; and
- a vent stack extending to a location remote from said mold and open to the atmosphere at said remote location, said vent stack being in telescopic engagement with said exhaust pipe, whereby cooling gas introduced into said shroud can leave said shroud only through said exhaust pipe and said vent stack.

4. The improvement of claim 1 wherein the open end of said shroud has an inner edge whose peripheral dimension is larger than the peripheral dimension of the complemental inner edge of said ring mold to thereby create an offset between said inner edges, whereby flow of gas from around said baffle will create a subatmospheric pressure zone in the area of said offset.

5. An apparatus for cooling a glass part, contained within an open-top mold, with a high volume flow of gas which comprises, in combination:
- a shroud having a closed end remote from said mold and an open end adjacent to but spaced from the upper surface of said mold, said open end having an opening that is complemental in shape to the shape of the upper surface of said mold;
- a cooling tube, through which said gas passes, secured in an opening formed in the closed end of said shroud in substantially gas-tight relationship, said cooling tube extending through said shroud and terminating adjacent said glass part;
- a baffle, attached to the lower end of said cooling tube, said baffle having a shape complemental to but slightly smaller than the opening in said mold; and
- means for venting all gas introduced through said cooling tube into said shroud to a location remote from said mold.

6. The apparatus of claim 5 wherein the open end of said shroud has an inner edge whose peripheral dimension is greater than the peripheral dimension of the complemental inner edge of said mold to thereby create an offset between said inner edges, whereby flow of gas from around said baffle will create a subatmospheric pressure zone in the area of said baffle.

* * * * *